US010676200B2

(12) United States Patent
Misfeldt et al.

(10) Patent No.: US 10,676,200 B2
(45) Date of Patent: Jun. 9, 2020

(54) MACHINE-IMPLEMENTED METHOD FOR THE ADAPTIVE, INTELLIGENT ROUTING OF COMPUTATIONS IN HETEROGENEOUS COMPUTING ENVIRONMENTS

(71) Applicants: Trevor Misfeldt, Corvallis, OR (US); Kenneth Baldwin, Albany, OR (US); Paul Shirkey, Corvallis, OR (US)

(72) Inventors: Trevor Misfeldt, Corvallis, OR (US); Kenneth Baldwin, Albany, OR (US); Paul Shirkey, Corvallis, OR (US)

( * ) Notice: Subject to any disclaimer, the term of this patent is extended or adjusted under 35 U.S.C. 154(b) by 486 days.

(21) Appl. No.: 14/543,637

(22) Filed: Nov. 17, 2014

(65) Prior Publication Data
US 2016/0140013 A1 May 19, 2016

Related U.S. Application Data

(60) Provisional application No. 61/905,528, filed on Nov. 18, 2013.

(51) Int. Cl.
| | | |
|---|---|---|
| G06F 9/44 | (2006.01) | |
| B64D 27/26 | (2006.01) | |
| G06F 11/34 | (2006.01) | |
| B64D 27/10 | (2006.01) | |
| F01D 25/04 | (2006.01) | |
| F01D 25/28 | (2006.01) | |

(52) U.S. Cl.
CPC ............ *B64D 27/26* (2013.01); *B64D 27/10* (2013.01); *F01D 25/04* (2013.01); *F01D 25/28* (2013.01); *G06F 11/3433* (2013.01); *G06F 11/3447* (2013.01); *G06F 11/3466* (2013.01); *B64D 2027/266* (2013.01); *F05D 2220/323* (2013.01); *F05D 2230/60* (2013.01); *F05D 2240/90* (2013.01); *F05D 2260/96* (2013.01); *G06F 11/3409* (2013.01); *G06F 11/3419* (2013.01)

(58) Field of Classification Search
None
See application file for complete search history.

(56) References Cited

U.S. PATENT DOCUMENTS

| | | | |
|---|---|---|---|
| 7,009,610 B1 | 3/2006 | Keeley | |
| 7,685,089 B2 | 3/2010 | Nochta et al. | |
| 8,527,239 B2 | 9/2013 | Sowerby et al. | |
| 2003/0071840 A1* | 4/2003 | Huang | H04L 41/22 715/736 |
| 2006/0168194 A1* | 7/2006 | Lake | G06F 9/505 709/224 |
| 2013/0144973 A1* | 6/2013 | Li | H04L 41/26 709/217 |

* cited by examiner

*Primary Examiner* — Craig Dorais
(74) *Attorney, Agent, or Firm* — Stewart Myers

(57) ABSTRACT

A machine-implemented method for the intelligent, adaptive routing of computations in heterogeneous GPU computing environments is provided herein. The method is implemented by a machine as a series of machine-executable steps that cause the machine to route mathematical and statistical computations in engineering, scientific, financial, and general-purpose applications to the processor, or a plurality of processors, that is best able to process the computations.

20 Claims, 3 Drawing Sheets

MACHINE-IMPLEMENTED METHOD FOR THE ADAPTIVE, INTELLIGENT ROUTING OF COMPUTATIONS IN HETEROGENEOUS COMPUTING ENVIRONMENTS

CROSS-REFERENCES TO RELATED APPLICATIONS

This application claims priority to U.S. Provisional Patent Application Ser. No. 61/905,528 filed on Nov. 18, 2013 entitled "Adaptive, Intelligent Routing of Computations in Heterogeneous Computing Environments", the disclosure of which is hereby incorporated by reference.

FIELD OF THE INVENTION

The present invention relates to intelligent routing of computations in heterogeneous computing environments, and more specifically, to the development of adaptive decision-making models for optimal routing of mathematical or statistical computations.

BACKGROUND OF THE INVENTION

Many computing devices include both a central processing unit (CPU) for general purpose processing and a graphics processing unit (GPU) that is devoted primarily to graphics purposes. The central processing unit does general tasks like running applications.

A heterogeneous computing environment includes different types of processing or computing devices within the same system or network. Thus, a typical platform with both a CPU and a GPU is an example of a heterogeneous computing environment. Another example of a heterogeneous computing environment would be a CPU connected via a network connection to a virtual cluster of computers referred to as a compute cloud.

Cloud computing allows a user to utilize applications or services running on a remotely located computer rather than on the user's local computer. For example, data may be processed in the cloud by forwarding the data from a client computer to one or more server computers, where the data is processed before returning the processed data back to the client computer. This way, the client computer offloads processing tasks to computers in the cloud. Cloud computing can provide significant processing resources and can greatly increase the speed of processing tasks, especially when those tasks are intelligently routed to the cloud(s).

Computers and other such data processing devices have at least one control processor that is generally a CPU. Such computers and processing devices may also use GPUs for specialized types of processing. For example, GPUs are designed to be particularly suited for graphics processing operations. GPUs generally comprise multiple processing elements that are ideally suited for executing the same instruction in parallel on different data streams, such as in data-parallel processing. A GPU can comprise, for example, a graphics processor unit, a graphics processor, a graphics processing core, a graphics processing device, or the like. In general, a CPU functions as the host or controlling processor and transfers specialized functions such as graphics processing to other processors such as GPUs.

With the availability of multi-core CPUs where each CPU has multiple processing cores, substantial processing capabilities that can also be used for specialized functions are available in CPUs. One or more of the computation cores of multi-core CPUs and GPUs can be part of the same or on different dies. Recently, programming systems have been introduced for General Purpose GPU (GPGPU) style computing to execute non-graphics applications on GPUs. The GPGPU style of computing advocates using the CPU to primarily execute control code and to offload performance critical data-parallel code to the GPU. The GPU is primarily used as an accelerator. However, some GPGPU programming systems allow the use of both CPU cores and GPU cores as accelerator targets.

Several frameworks have been developed for heterogeneous computing platforms that have CPUs and GPUs. These frameworks include BrookGPU by Stanford University, OpenCL™ by an industry consortium named Khronos Group, and CUDA™ by NVIDIA.

The OpenCL™ framework offers a C-like development environment in which users can create applications for GPU. OpenCL™ enables the user, for example, to specify instructions for offloading some computations, such as data-parallel computations, to a GPU. OpenCL™ also provides a compiler and a runtime environment in which code can be compiled and executed within a heterogeneous computing system.

NVIDIA's CUDA™ (Compute Unified Device Architecture) technology provides a C language environment that enables programmers and developers to write software applications to solve complex computational problems such as video and audio encoding, modeling for oil and gas exploration, and medical imaging. The applications are configured for parallel execution by a multi-core GPU and typically rely on specific features of the multi-core GPU.

Frameworks such as CUDA™, at present, require the programmer to determine what parts of the application(s) are executed on the CPUs and the GPUs of the heterogeneous system. Determining this split, however, is not trivial as GPUs and CPUs spanning a broad spectrum of performance characteristics are available on the market and can be mixed and matched in a given system. In addition, the available resources on the system at runtime may vary depending on other applications executing on the same system. Therefore, application programmers are faced with implementing elaborate, complex, dynamic schemes for allocating multiple kernels to processors within their applications or settling for sub-optimal performance.

There exists a significant need in the prior art for a method that intelligently routes computations in heterogeneous computing environments at runtime between CPUs and GPUs to optimize performance and maximize efficient use of available hardware. The present invention meets this need by providing a method for evaluating a heterogeneous computing environment's capability and creating a model that can be used to make decisions for where to route particular computations.

BRIEF SUMMARY OF THE INVENTION

GPU computing is the use of one or more GPUs together with a CPU to accelerate computations in software applications. Ideally, computations are routed to take maximum advantage of available hardware at runtime—running each computation on the processor which can perform the computation the fastest.

Intelligent routing requires understanding the performance characteristics of the specific CPU and GPUs in a particular runtime system: processor speeds, number of cores, memory limits, and so forth. In rare cases, the hardware configuration is fixed and known in advance, and this intelligence can be built into the software application.

More commonly, software applications are deployed to heterogeneous computing environments, which are not known, and cannot be known, in advance. A particular deployment system may also change over time, as new hardware is installed in the system, or system performance changes. System performance can change almost instantly depending on the tasks that need to be executed. For example, an idle system can quickly be retasked to have the GPU processor render video while the CPU executes database-related instructions.

The present invention is a method for intelligent, adaptive routing of computations in heterogeneous GPU computing environments. In an embodiment of the present invention, the method is used to route mathematical and statistical computations in engineering, scientific, and financial applications, but the method is suitable for general-purpose applications.

The preceding brief description is intended to merely outline some functions and advantages of the present invention. The following disclosure will set forth other functions and advantages of the present invention along with novel features that distinguish the present invention from the prior art. It is to be understood that the following disclosure is by no means intended to limit the scope of the present invention or any of its embodiments. It is also to be understood that the accompanying illustrations are presented for descriptive purposes only and similarly are not intended to limit the scope of present invention or any of its embodiments. The following disclosure and accompanying illustrations may describe various features of novelty that characterize the invention. The invention does not reside any particular feature when taken in the singular, but in the combination of features as described herein.

Other novel features which are characteristics of the invention, as to organization and method of operation, together with further and advantages thereof will be better understood from the following description considered in connection with the accompanying figures, in which preferred embodiments of the invention are illustrated by way of example. It is to be expressly understood, however, that the figures are for illustration and description only and are not intended as a definition of the limits of the invention. The various features of novelty which characterize the invention are pointed out with particularity in the following description. The invention resides not in any one of these features taken alone, but rather in the particular combination of all of its structures for the functions specified.

Figure 1:
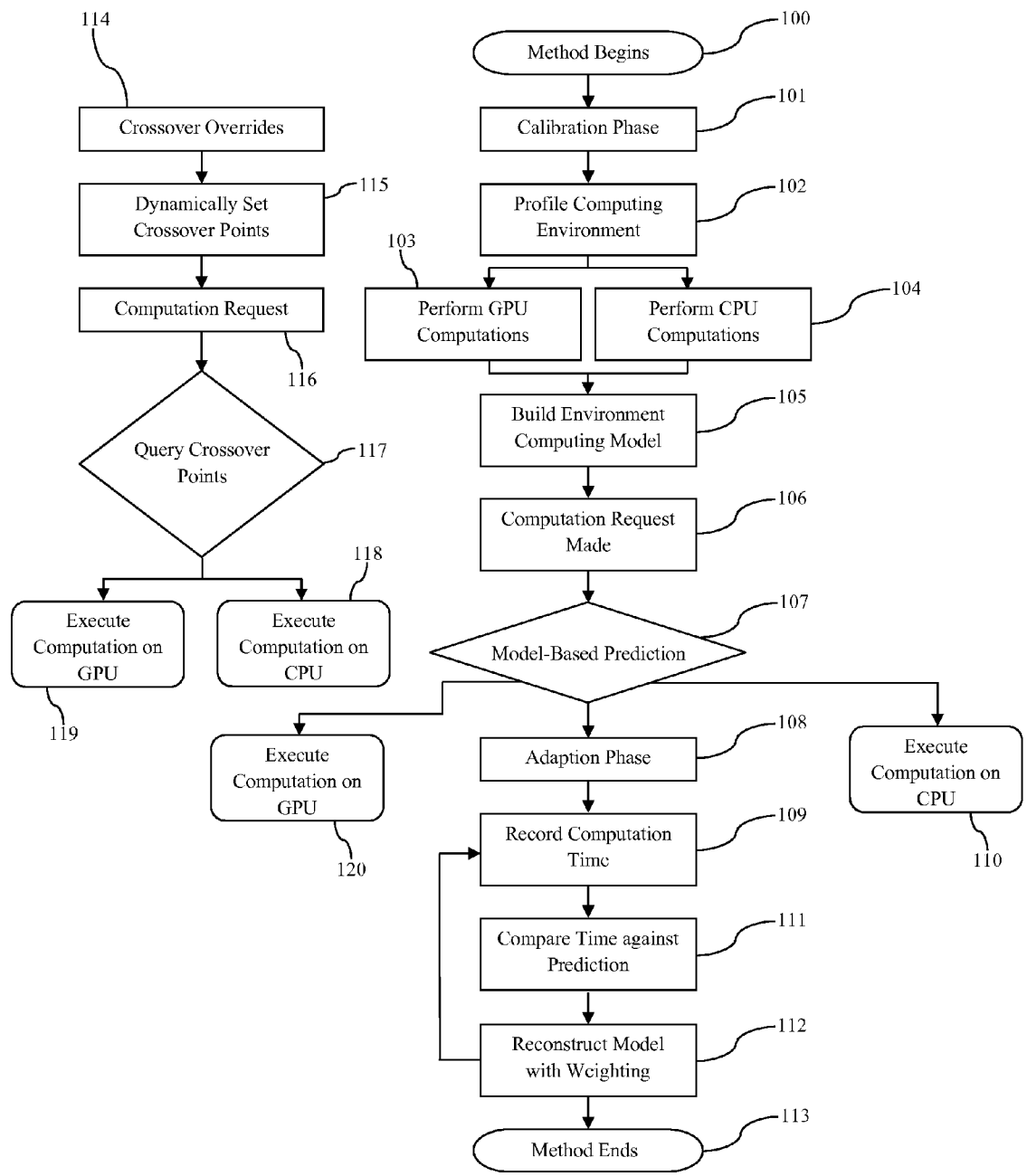
FIG. 1 is a flowchart illustrating a machine-implemented method for the adaptive, intelligent routing of computations in a heterogeneous computing environment as according to one embodiment of the present invention.

A further understanding of the present invention can be obtained by reference to a preferred embodiment set forth in the accompanying description. Although the illustrated embodiments are merely exemplary of apparatus or methods for carrying out the present invention, both the organization and method of operation of the invention, in general, together with further objectives and advantages thereof, may be more easily understood by reference to the illustrations and the following description. The figures are not intended to limit the scope of this invention, but merely to clarify and exemplify the invention.

DETAILED DESCRIPTION OF THE INVENTION

In the following detailed description, reference is made to specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the terms "embodiment(s) of the invention", "alternative embodiment(s)", and "exemplary embodiment(s)" do not require that all embodiments of the method, system, and apparatus include the discussed feature, advantage or mode of operation. The following description of the preferred embodiment is merely exemplary in nature and is in no way intended to limit the invention, its application, or use.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter. Those skilled in the art will appreciate that the conception upon which this disclosure is based may be readily utilized as a basis for the designing of other structures, methods and systems for carrying out the purposes of the present invention. It is important, therefore, that any embodiments of the present invention be regarded as including such equivalent constructions insofar as they do not depart from the spirit and scope of the present invention.

In a manner described below, the data processing aspects of the present invention may be implemented, in part, by programs that are executed by a computer. The term "computer" as used herein includes any device that electronically executes one or more programs, such as personal computers (PCs), hand-held devices, multi-processor systems, microprocessor-based programmable consumer electronics, network PCs, minicomputers, mainframe computers, routers, gateways, hubs and the like. The term "program" as used herein includes applications, routines, objects, components, data structures and the like that perform particular tasks or implement particular abstract data types. The term "program" as used herein further may connote a single program application or module or multiple applications or program modules acting in concert. The data processing aspects of the invention also may be employed in distributed computing environments, where tasks are performed by remote processing devices that are linked through a communications network. In a distributed computing environment, programs may be located in both local and remote memory storage devices.

Further, the purpose of the Abstract herein is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application nor is it intended to be limiting as to the scope of the invention in any way.

Referring now to the present invention, there is introduced a method specifically intended to be executed by a machine that intelligently routes computations in a heterogeneous computing environment and adapts to any changes within that environment. For the purpose of clarity, all like elements mentioned in this description, or illustrated in the accompanying Figures, will have the same designations. The terms "machine-implemented method", "method", "present invention", and "invention" may be used interchangeably. In addition to the functions, features, components, and abilities of the invention already discussed in this specification, the invention may also have, but not be limited to, the following features contained within the description below.

The present invention can generally be described as a method for deciding how to route computations intelligently between two or more possible destinations. Although those destinations might be one or more CPUs or GPUs, they could also be other computation devices, such as additional coprocessors, local or cloud-based servers, or clouds or cloud devices. The present invention can intelligently route computations to any compute destination. A compute destination being any device or processor capable of performing computations. A compute destination also includes cloud based devices such as servers, and clouds as a whole. It is possible that the present invention may be used to intelligently route computations to one or more clouds. The scope of the present invention is not limited to individual CPU or GPU compute destinations.

In one embodiment, the present invention solves the shortcomings of the prior art by providing a machine-implemented method for deciding whether a CPU or GPU, or a plurality of either, is best suited to execute mathematical or statistical computations. This machine-implemented method obtains samples from processors in a heterogeneous computing environment then builds a model that can be used to decide which processors will execute particular computations in the most efficient manner. The present invention is able to adapt to changes in the heterogeneous environment, such as the addition or removal of hardware, to continue to provide for the most efficient routing of mathematical or statistical computations. The preferred embodiments described below set forth the present invention in greater detail.

Referring now to FIG. 1 there is shown a flowchart illustrating a machine-implemented method for the adaptive, intelligent routing of computations in a heterogeneous computing environment as according to one embodiment of the present invention. The method begins (100) with a calibration phase (101) during which the performance of a particular GPU computing environment is profiled (102). The performance of the computing environment is profiled (102) by executing identical computations on each GPU (103) and CPU (104) for a range of computation types and inputs. The data collected from profiling can include the time required to execute the computations on the GPU (103) and CPU (104). The data gathered when profiling the computing environment (102) is used to build a model of the computing environment (105). The model enables the method to make intelligent decisions about how to route computations within the environment for maximum performance.

In some embodiments of the present invention, the model of the computing environment is built (105) by fitting curves to sampled data points using a non-linear least squares (NLS) fitting method. Each fitted curve identifies a crossover point, in terms of problem size, at which it is advantageous to cross over from using one processor, such as a CPU, to another, such as a GPU, for a particular computation type.

In other embodiments of the present invention, an understanding or existing knowledge of infrastructure, computational complexity of the problem, or the like may be used to construct the model. For many model types, such a linear models or low-dimensionality polynomials, the crossovers can be determined analytically. In other cases, it may be necessary to use numerical tools, such as root finding algorithms to find the crossover.

In still other embodiments of the present invention, building the model of the computing environment (105) occurs using a linear or a nonlinear least squares techniques, such as linear regression, trust-region methods, or the Levenberg-Marquardt algorithm.

When a request is made to perform a computation of a given type and inputs (106), possibly of an input not previously profiled, the model of the computing environment is consulted to generate a prediction (107) as to which will be the best processor to run that computation. If the model-based prediction (107) predicts that the computation will be most efficiently performed on a GPU, then the computation is executed on a GPU (120). If the model-based prediction (107) predicts that the computation will be most efficiently performed on a CPU, then the computation is executed on a CPU (110).

Depending on how much time is available for the calibration phase, the initial model of the computing environment can be more or less detailed by profiling different numbers of computation types, and by sampling different inputs. Once the calibration phase (101) is complete, the internal model can be persisted to a file or other storage medium and reloaded when the method begins (100) a second time.

During an adaptation phase (108), the model of the computing environment is refined by monitoring system performance and updating the model (112). Each time a computation of a particular type and inputs is run, the time is recorded (109) and compared against the time predicted by the model of the computing environment (111). The model of the computing environment is reconstructed to reflect the new data, either continuously or at a specified interval, possibly with a weighting method (112) giving greater weight to more recent timings, and the model is then re-persisted. The method can end (113), or continue the adaptation phase (108) by recording additional computation times (109) to further reconstruct the model of the computing environment possibly with weighting (112). Repetition of the adaptation phase (108) enables the model to both refine the initial calibration over time, and to adapt to changes in the deployment system. Changes in the deployment system includes changes in the hardware components that comprise the system such as the addition of additional GPUs or CPUs.

It should be noted that in some embodiments, the adaptive model building process may use some or all of the same techniques as used during the calibration phase. However, in other embodiments the adaptive model building process may use different techniques as those used during the calibration phase (101).

In some embodiments of the present invention, the user or software application may wish to override the model-based routing. A user may wish to run a computation on a GPU, even if performance suffers, to free up the CPU for other uses. The current implementation enables the application to dynamically set crossover points (115), also referred to herein as crossover overrides (114) which override any model-based crossovers. Overrides may be used for load balancing, but are also very helpful during testing and benchmarking where it's useful to have direct control over the routing of a computation.

When a computation request (116) is made when the crossover points are set dynamically (115), the crossover points are queried (117) to determine whether to execute the computation on a GPU (119) or a CPU (118).

Figure 2:
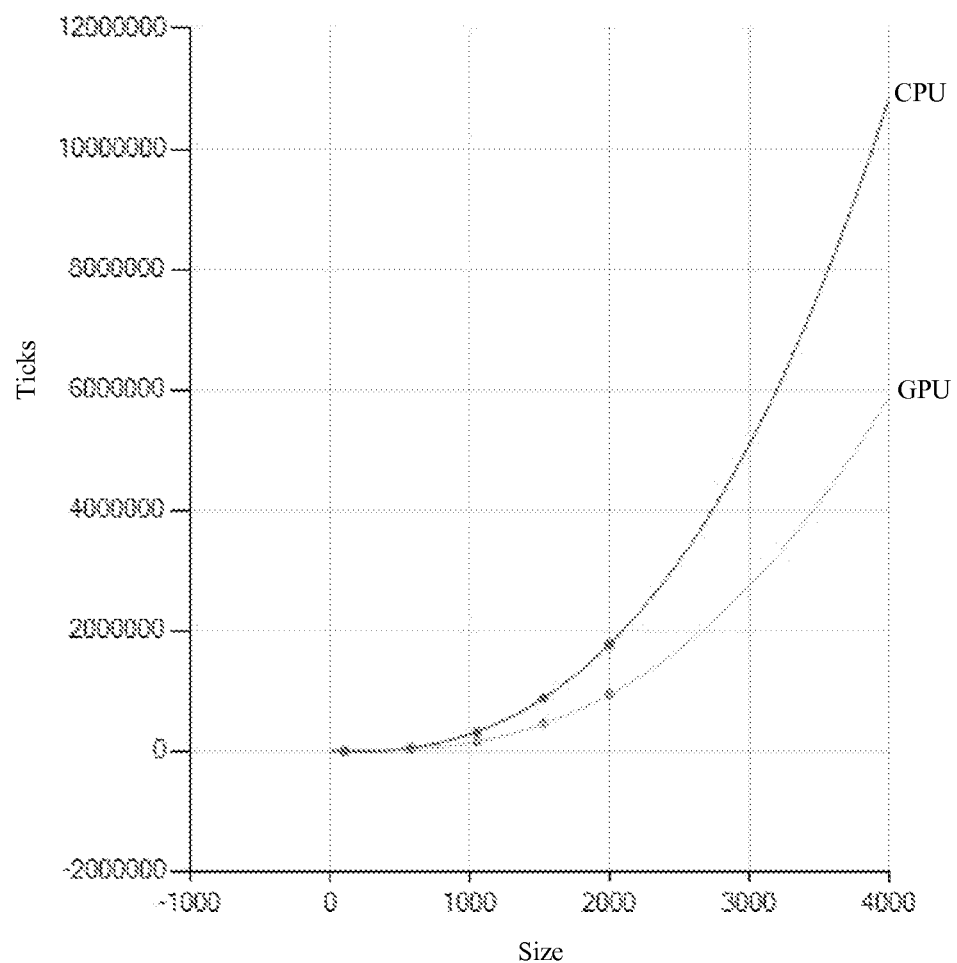
FIG. 2 is a chart showing no crossover between the amount of time required to execute mathematical or statistical computations a CPU as compared to a GPU as according to one embodiment of the present invention.

Referring now to FIG. 2, there is a chart showing no crossover between the amount of time required to execute mathematical or statistical computations a CPU as compared to a GPU as according to one embodiment of the present invention. The chart shows that as the size of a mathematical or statistical computation increases, the number of computer clock cycles, ticks, required to execute computation is always greater when executed on a CPU as compared to a GPU.

If, during the calibration phase (FIG. 1 (101)) or adaptation phase (FIG. 1 (108)), when the model of the computing environment is built (FIG. 1 (105)) or reconstructed (FIG. 1 (112)), the number of ticks required to execute the computation on the CPU is always higher than the number of ticks required to execute the computation on the GPU, then the model-based prediction (107) will predict that the computation will be most efficiently executed on the GPU and the computation will be executed by the GPU (120). In the scenario illustrated in FIG. 2, it is beneficial to always route mathematical or statistical computations to the GPU instead of the CPU because less ticks are required by the GPU to execute the computation.

Figure 3:
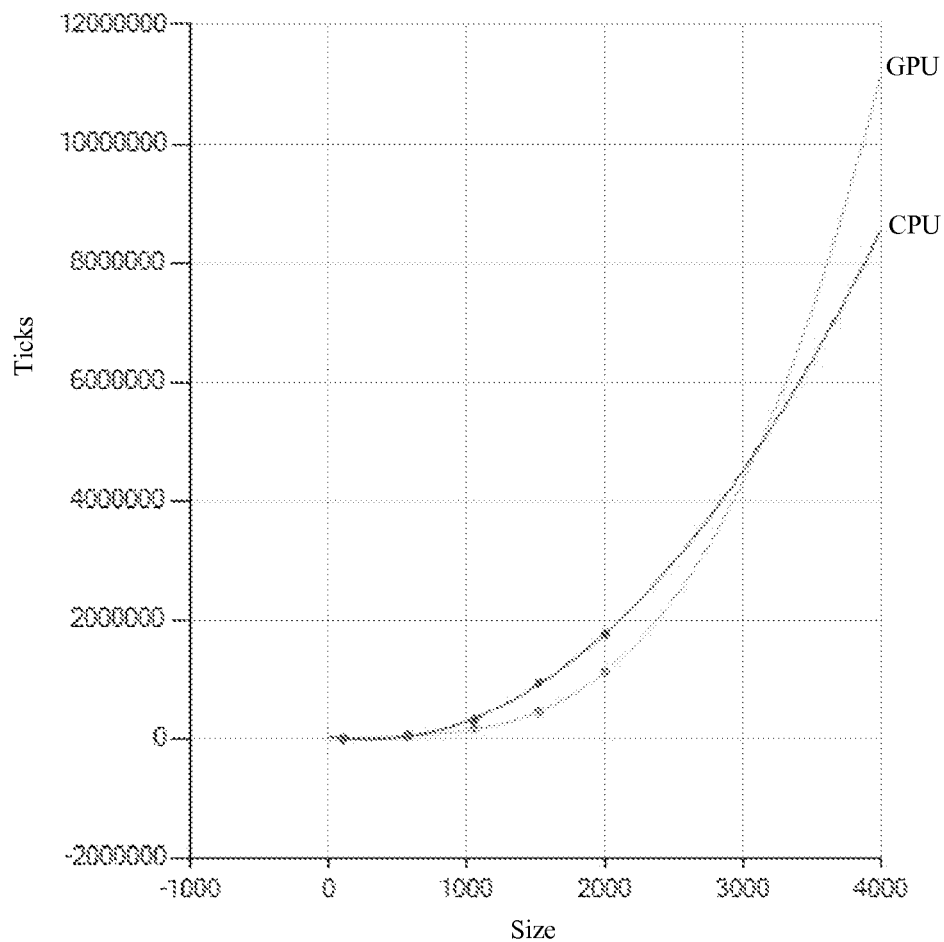
FIG. 3 is a chart showing high crossover between the amount of time required to execute mathematical or statistical computations a CPU as compared to a GPU as according to one embodiment of the present invention.

Referring now to FIG. 3, there is a chart showing high crossover between the amount of time required to execute mathematical or statistical computations a CPU as compared to a GPU as according to one embodiment of the present invention. The chart shows that as the size of a mathematical or statistical computation increases, the number of ticks required to execute the computation is greater when executed on a GPU as compared to a CPU after a certain size.

If, during the calibration phase (FIG. 1 (101)) or adaptation phase (FIG. 1 (108)), when the model of the computing environment is built (FIG. 1 (105)) or reconstructed (FIG. 1 (112)), the number of ticks required to execute the computation on the GPU is higher than the number of ticks required to execute the computation on the CPU at a certain computational size, then a crossover point is created for that computational size and the model-based prediction (107) will predict that computations smaller the crossover point will be most efficiently executed on the GPU, and computations larger than the crossover point will be most efficiently executed on the CPU. In the scenario illustrated in FIG. 3, it is beneficial to always route mathematical or statistical computations to the GPU instead of the CPU when smaller than the crossover point because when smaller than the crossover point, less ticks are required by the GPU to execute the computation, and to the CPU when larger than the crossover point because when larger than the crossover point, less ticks are required by the CPU to execute the computation.

Some embodiments of the present invention can determine the order of complexity of many of the algorithms by accessing resource documentation. For example, the complexity of matrix multiplication is approximately $O(n^{2.8})$. Resource documentation can be used by the method to fit the right kind of crossover point curve to the data points. In matrix multiplication, we would expect the curve to be a cubic function that grows with the size of the problem. Fitting a known function results in a more exact establishment of crossover points.

With GPU operation, delays in transmitting computations to the GPU are compensated for by measuring the amount of time required to transmit a computation to the GPU. This delay is used when calculating the crossover points. Alternatively, the GPU can be queried to see if the delay information is contained within it.

For some mathematical or statistical computations the calculation of the crossover points depends on multiple factors and not just the size or complexity of the calculation. By way of example, the time required by a CPU or GPU to execute some matrix operations depend on the number of rows and number of columns and not just the number of cells. Embodiments of the present invention will compensate for these additional factors and will fit a surface to the data points instead of a curve. For other algorithm types as required an n-dimensional (multi-dimensional) fit, will be used to determine crossover points.

Some embodiments take samples when determining crossover points at equal intervals. Logarithmically-spaced intervals can be used by other embodiments to produce more accurate crossover points.

During the adaptation phase (FIG. 1 (108)), the method may start with fixed crossover points or may use initial estimates instead of performing the calibration phase (FIG. 1 (101)). The model will then be reconstructed (FIG. 1 (112)) and improved over time by sampling the timing of user calculations. In this way, the method can improve its decision-making capability while not appreciably slowing down their calculations.

Sampling user calculations has a major benefit in that the method optimizes predictions based on the types of computations most important to the user. By way of example, if the user primarily performs large FFT calculations then most of the computing environment model will contain FFT function crossover point information.

In addition to the foregoing Description, the present invention can be implemented in several ways. The present invention could be used to decide between any heterogeneous hardware. It can be used to decide the best place to run math calculations. It could certainly be used to determine the best compute device to execute any sort of algorithm. A model of behavior is developed by the method in order to make decisions. That model can be constructed using curve-fitting or surface-fitting. Furthermore, many different approaches could be used to construct the decision-making model.

There are a plurality of means for the model to adapt over time. It is possible to: run a new and complete calibration at startup, sample automatically over time and then adjust the model accordingly by adding the new data, drop the oldest data points and use the newer ones, or weight all sampled data and bias towards new data, allow the user decide on which technique is best and when to perform them. The aforementioned adaptation techniques are illustrative in nature only and not intended to limit the scope of the present invention. It is possible that the present invention may use adaptation techniques not mentioned in this Description, but will occur to those skilled in the art. Accordingly, all suitable modifications and equivalents to the adaptation techniques may be resorted to and considered falling within the scope present invention.

The above detailed description sets forth rather broadly the more important features of the present invention in order that its contributions to the art may be better appreciated.

As such, those skilled in the art will appreciate that the conception, upon which disclosure is based, may readily be utilized as a basis for designing other structures, methods, and systems for carrying out the several purposes of the present invention. It is important, therefore, that this description be regarded as including such equivalent constructions insofar as they do not depart from the spirit and scope of the present invention.

Although certain example machine-implemented methods, apparatus and articles of manufacture have been described herein, the scope of coverage of this application is not limited thereto. On the contrary, this application covers all methods, apparatus and articles of manufacture fairly falling within the scope of the invention either literally or under the doctrine of equivalents.

It should be noted that embodiments of the above-mentioned invention are implemented by instructions executed on a computer. More specifically, software running on a processor executes commands that enable a computer to operate in the manner described above. This software can be viewed as a series of machine-implemented steps that provide the functionality of the invention. The machine-implemented steps transforms developer input into a functional method for deciding whether to execute mathematical or statistical computations on a CPU or a GPU.

Of course, persons of ordinary skill in the art will recognize that the configuration of the system illustrated in the embodiments may vary. Additionally, although this patent discloses embodiments including, among other components, software or firmware executed on hardware, it should be noted that such embodiments are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such embodiments.

At least some of the above described embodiments are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of this disclosure are not limited to such devices, standards and/or protocols. Such systems are periodically superseded by faster or more efficient systems having the same general purpose. Accordingly, replacement devices, standards and/or protocols having the same general functions.

Directional terms such as "front", "forward", "back", "rear", "in", "out", "downward", "upper", "lower", "top", "bottom", "outer", "interior" and the like may have been used in the description. These terms are applicable to the embodiments shown and described herein. These terms are merely used for the purpose of description and do not necessarily apply to the position in which components or items within the present invention may be used.

Therefore, the foregoing is considered as illustrative only of the principles of the present invention. Further, since numerous modifications and changes will readily occur to those skilled in the art, it is not desired to limit the present invention to the exact construction and operation described, and accordingly, all suitable modifications and equivalents may be resorted to, falling within the scope present invention. While the above description describes various embodiments, it will be clear that the present invention may be otherwise easily adapted to fit any configuration as desired or required.

As various changes could be made in the above constructions without departing from the scope of the invention, it is intended that all matter contained in the above description shall be interpreted as illustrative and not in a limiting sense.

We claim:

1. A machine-implemented method for use with a computer that adaptively and intelligently routes computations in a heterogeneous computing environment, the machine-implemented method comprising the steps of:
   (A) profiling the performance of a heterogeneous computing environment by performing the substeps of:
   (A-1) executing a computation on a first type of compute destination,
   (A-2) executing the computation on a second type of compute destination, and
   (A-3) recording data from the execution of the computation on the first and second types of compute destinations;
   (B) building a model of the heterogeneous computing environment from the data recorded during the execution of the computation on the first and second types of compute destinations;
   (C) persisting the model to a storage medium;
   (D) consulting the model of the heterogeneous computing environment to generate a prediction as to whether the first type of compute destination or the second type of compute destination will be the most efficient for executing a requested computation;

(E) executing the requested computation at the compute destination that is predicted by the model of the heterogeneous computing environment to be the most efficient;

(F) recording the time required to execute the requested computation at the compute destination that is predicted by the model of the heterogeneous computing environment to be the most efficient;

(G) reconstructing the model of the heterogeneous computing environment using the time that is recorded in step (F) above; and (H) re-persisting the reconstructed model to the storage medium.

2. The machine-implemented method of claim 1, wherein the heterogeneous computing environment contains at least one GPU and at least one CPU.

3. The machine-implemented method of claim 1, wherein the model of the heterogeneous computing environment built in step (B) is built by fitting curves to sampled data points using a non-linear least squares fitting method.

4. The machine-implemented method of claim 1, wherein the model of the heterogeneous computing environment built in step (B) contains crossover points where each crossover point representing a computation size where it is advantageous to cross over from using the first type of compute destination to the second type of computer destination.

5. The machine-implemented method of claim 4, wherein the crossover points are set dynamically by the machine-implemented method or by a user.

6. The machine-implemented method of claim 1, wherein the time required to execute the requested computation that is recorded in step (F) is given additional weight when reconstructing the model of the heterogeneous computing environment in step (G).

7. The machine-implemented method of claim 1, wherein steps (F) and (G) of the machine-implemented method adapt the model of the heterogeneous computing environment to compensate for any hardware changes in the heterogeneous computing environment.

8. A machine-implemented method for use with a computer that adaptively and intelligently routes computations in a heterogeneous computing environment, the machine-implemented method comprising:

executing a calibration phase and an adaptation phase; the calibration phase comprising the steps of:

(A) executing a computation on a first type of compute destination;

(B) executing the same computation on a second type of compute destination;

(C) recording data from the execution of the computation on the first and second types of compute destinations;

(D) using the data recorded in step (C) above to identify at least one crossover point where the crossover point represents a computation size where it is advantageous to cross over from executing a requested computation on the first type of compute destination to executing the requested computation on the second type of computer destination;

(E) storing, the crossover point to a storage medium; and (F) executing the requested computation at the first type of compute destination if the requested computation is larger than the crossover point, and executing the requested computation at the second type of compute destination if the requested computation is smaller than the crossover point;

the adaptation phase comprising the steps of:

(G) recording the time required to execute the requested computation at the chosen compute destination;

(H) resetting the crossover point based on the time recorded in step (G) above; and (I) re-storing the reset crossover point to the storage medium.

9. The machine-implemented method of claim 8, wherein the first type of compute destination is a GPU and the second type of compute destination is a CPU.

10. The machine-implemented method of claim 8, wherein the first type of compute destination is a device on the machine implementing the method and the second type of compute destination is a cloud based device.

11. The machine-implemented method of claim 8, wherein the crossover point is identified in step (D) or reset in step (H) by collecting additional data and fitting a surface to the data.

12. The machine-implemented method of claim 8, wherein the crossover point is identified in step (D) by using root finding algorithms.

13. The machine-implemented method of claim 8, wherein the crossover point is identified in step (D) by accessing resource documentation to determine the order of complexity of an algorithm.

14. A machine-implemented method for use with a computer that adaptively and intelligently routes computations in a heterogeneous computing environment, the machine-implemented method comprising:

executing a calibration phase, the calibration phase comprising the steps of:

(A) executing a computation on a CPU;

(B) executing the same computation on a GPU;

(C) recording the time required to execute the computation on the CPU and GPU;

(D) using the time recorded in step (C) above to identify at least one crossover point where the crossover point represents a computation size where it is advantageous to cross over from executing a requested computation on the CPU to executing the requested computation on the GPU;

(E) storing the crossover point to a storage medium;

(F) consulting the crossover point when a requested computation is to be executed; and (G) executing the requested computation at the CPU if the crossover point indicates that the requested computation will be most efficiently executed at the CPU, and executing the requested computation at the GPU if the crossover point indicates that the requested computation will be most efficiently executed at the GPU;

executing an adaptation phase, the adaptation phase comprising the steps of:

(H) recording the time required to execute the requested computation at the chosen compute destination;

(I) giving the time recorded in step (H) above a greater weight than the time recorded during step (C) of the calibration phase above, (J) resetting the crossover point based on the time recorded in step (H) above after weighting the time in step (I) above;

(K) re-storing the reset crossover point to a storage medium; and (L) executing the adaptation phase when a second requested computation is to be executed.

15. The machine-implemented method of claim 14, wherein the calibration phase is not executed and the crossover point is set dynamically.

16. The machine-implemented method of claim 15, wherein the crossover point is set dynamically by accessing resource documentation.

17. The machine-implemented method of claim 14, wherein the crossover point is identified in step (D) of the calibration phase by using a non-linear least squares fitting method.

18. The machine-implemented method of claim 14, wherein the crossover point set during the calibration phase is set as part of a profiling function that profiles the heterogeneous computing environment.

19. The machine-implemented method of claim 18, wherein the profiling function further includes building a model of the heterogeneous computing environment.

20. The machine-implemented method of claim 14, wherein additional data is collected during the calibration phase.

\* \* \* \* \*